US012436011B2

(12) United States Patent
Kishore et al.

(10) Patent No.: US 12,436,011 B2
(45) Date of Patent: Oct. 7, 2025

(54) FLOW SENSING DEVICE

(71) Applicant: HONEYWELL INTERNATIONAL INC., Charlotte, NC (US)

(72) Inventors: Kuna Venkat Satya Rama Kishore, Charlotte, NC (US); Ganesh Budnatti Eswarappa, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 231 days.

(21) Appl. No.: 18/316,702

(22) Filed: May 12, 2023

(65) Prior Publication Data

US 2023/0375388 A1 Nov. 23, 2023

(30) Foreign Application Priority Data

May 17, 2022 (IN) .............................. 202211028291

(51) Int. Cl.
G01F 1/68 (2006.01)
(52) U.S. Cl.
CPC ....................... G01F 1/68 (2013.01)
(58) Field of Classification Search
CPC ................................ G01F 1/68–699
See application file for complete search history.

(56) References Cited

U.S. PATENT DOCUMENTS

| 7,991,510 B2 * | 8/2011 | Duan ...................... G01F 1/667 |
| | | 700/282 |
| 8,539,812 B2 | 9/2013 | Stringham et al. |
| 10,254,142 B2 * | 4/2019 | Kostner ................ G01F 1/6888 |
| 10,960,125 B2 | 3/2021 | Loderer et al. |
| 11,644,353 B2 * | 5/2023 | Dalberg .................. G01F 1/684 |
| | | 137/468 |
| 2001/0029781 A1 | 10/2001 | Tai et al. |
| 2007/0191990 A1 | 8/2007 | Duan et al. |
| 2016/0025540 A1 | 1/2016 | Clay et al. |
| 2017/0138774 A1 | 5/2017 | Kostner et al. |
| 2021/0356305 A1 | 11/2021 | Dalberg et al. |

FOREIGN PATENT DOCUMENTS

| JP | 2001-004422 A | 1/2001 |
| JP | 2006-087545 A | 4/2006 |
| JP | 2009-505079 A | 2/2009 |

(Continued)

OTHER PUBLICATIONS

European search report Mailed on Oct. 16, 2023 for EP Application No. 23172416, 7 page(s).

(Continued)

*Primary Examiner* — Justin N Olamit
(74) *Attorney, Agent, or Firm* — Alston & Bird LLP

(57) ABSTRACT

Methods, apparatuses, and computer program products associated with flow sensing devices are provided. An example flow sensing device may comprise a controller component in electronic communication with a flow sensing component that is configured to: monitor at least one flow sensing component output, detect an air bubble at a location adjacent a surface of the flow sensing component based at least in part on the at least one flow sensing component output, and determine whether the air bubble satisfies an air bubble condition defining one or more predetermined characteristics.

16 Claims, 7 Drawing Sheets

(56) References Cited

FOREIGN PATENT DOCUMENTS

| | | | |
|---|---|---|---|
| JP | 2020-008508 A | 1/2020 | |
| WO | WO-2020051409 A1 * | 3/2020 | ............. G01F 1/684 |

OTHER PUBLICATIONS

English Translation of JP Office Action dated Aug. 2, 2024 for JP Application No. 2023077140, 5 page(s).
JP Office Action Mailed on Aug. 2, 2024 for JP Application No. 2023077140, 5 page(s).
English Translation of JP Office Action dated Feb. 28, 2025 for JP Application No. 2023077140, 6 page(s).
JP Office Action Mailed on Feb. 28, 2025 for JP Application No. 2023077140, 5 page(s).
English Translation of JP Notice of Allowance, including Search Report dated Jul. 2, 2025 for JP Application No. 2023077140, 2 page(s).
JP Notice of Allowance, including Search Report Mailed on Jul. 2, 2025 for JP Application No. 2023077140, 3 page(s).
EP Office Action Mailed on Aug. 20, 2025 for EP Application No. 23172416, 6 page(s).

* cited by examiner

FLOW SENSING DEVICE

CROSS-REFERENCE TO RELATED APPLICATIONS

This application claims priority pursuant to 35 U.S.C. 119(a) to Indian Application No. 202211028291, filed May 17, 2022, which application is incorporated herein by reference in its entirety.

BACKGROUND

Flow sensors may be used to measure a flow rate and/or quantity of a moving liquid or gas and may be implemented in various applications. For example, a flow sensor may be a part of a system for measuring and/or controlling the dosing of liquid or gas.

Such flow sensors are plagued by technical challenges and limitations. Through applied effort, ingenuity, and innovation, many of these identified problems have been solved by developing solutions that are included in embodiments of the present disclosure, many examples of which are described in detail herein.

BRIEF SUMMARY

In accordance with various examples of the present disclosure, an example flow sensing device may be provided.

The example flow sensing device may comprise: a housing; a flow sensing component disposed at least partially within the housing, wherein the flow sensing component is configured to make direct contact with a flowing media in a flow path of the flow sensing device; and a controller component in electronic communication with the flow sensing component that is configured to: monitor at least one flow sensing component output, detect an air bubble at a location adjacent a surface of the flow sensing component based at least in part on the at least one flow sensing component output, and determine whether the air bubble satisfies an air bubble condition defining one or more predetermined characteristics.

In some embodiments, the controller component is further configured to: in response to determining that the air bubble satisfies the air bubble condition, generate an air bubble indication.

In some embodiments, monitoring the at least one flow sensing component output comprises: determining whether the at least one sensing component output is less than a previous value, and determining whether the at least one sensing component output is equal to a predetermined minimal value.

In some embodiments, the flow sensing device is positioned such that an air gap is formed adjacent a surface of the flow sensing device when the flowing media makes direct contact therewith, and wherein at least one of the predetermined characteristics is associated with the air bubble being joined to the air gap.

In some embodiments, the flow sensing component comprises at least one heating element, a first flow sensing element positioned upstream with respect to the at least one heating element, and a second flow sensing element positioned downstream with respect to the at least one heating element.

In some embodiments, the flow sensing component comprises a sense die. In some embodiments, the controller component is configured to determine whether the air bubble satisfies an air bubble condition by: determining a first temperature output associated with the first flow sensing element; determining a second temperature output associated with the second flow sensing element; and comparing the first temperature output and the second temperature output.

In some embodiments, the controller component is further configured to: in response to detecting the air bubble, initiate a bubble dwell timer; determine a minimum permissible dwell time value; retrieve a maximum allowable dwell time factor; and in an instance in which the maximum allowable dwell time value is less than an air bubble dwell time value, generate an air bubble retention indication.

In some embodiments, the controller component is further configured to: in an instance in which the maximum allowable dwell time value is less than an end-of-flow factor, generate a second air bubble retention indication. In some embodiments, the end-of-flow factor is determined based at least in part on an estimated long flow void length in the flow path that is representative of an end-of-flow scenario.

In accordance with some embodiments of the present disclosure, a method is provided. The method may comprise: monitoring, by a controller component in electronic communication with a flow sensing component, at least one flow sensing component output, wherein the flow sensing component is disposed at least partially within a housing of a flow sensing device, and wherein the flow sensing component is configured to make direct contact with a flowing media in a flow path of the flow sensing device; detecting, by the controller component, an air bubble at a location adjacent a surface of the flow sensing component based at least in part on the at least one flow sensing component output; and determining, by the controller component, whether the air bubble satisfies an air bubble condition defining one or more predetermined characteristics.

The foregoing illustrative summary, as well as other exemplary objectives and/or advantages of the disclosure, and the manner in which the same may be accomplished, may be further explained in the following detailed description and its accompanying drawings.

BRIEF DESCRIPTION OF THE DRAWINGS

The description of the illustrative examples may be read in conjunction with the accompanying figures. It will be appreciated that, for simplicity and clarity of illustration, components and elements illustrated in the figures have not necessarily been drawn to scale, unless described otherwise. For example, the dimensions of some of the components or elements may be exaggerated relative to other components or elements, unless described otherwise. Examples incorporating teachings of the present disclosure are shown and described with respect to the figures presented herein, in which.

DETAILED DESCRIPTION OF THE INVENTION

Figure 1:
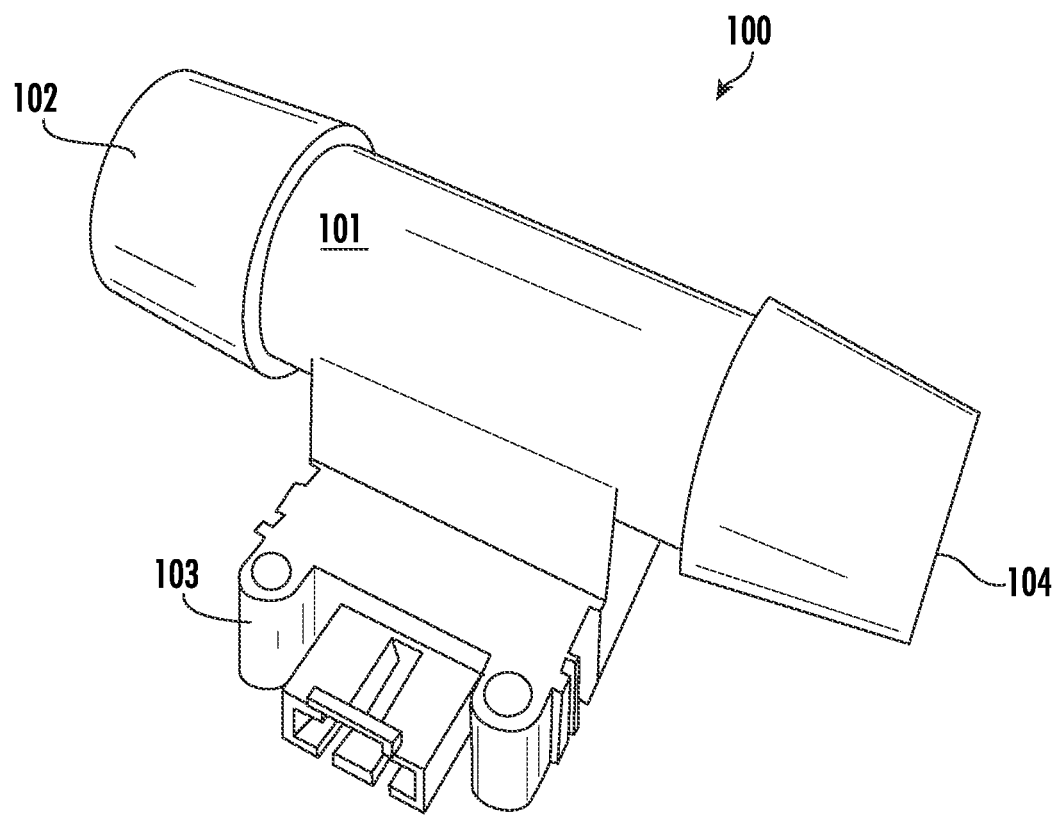
FIG. 1 illustrates a perspective view of an example flow sensing device, in accordance with examples of the present disclosure.

Some examples of the present disclosure will now be described more fully hereinafter with reference to the accompanying drawings, in which some, but not all examples of the disclosure are shown. Indeed, these disclosures may be embodied in many different forms and should not be construed as limited to the examples set forth herein; rather, these examples are provided so that this disclosure will satisfy applicable legal requirements. Like numbers refer to like elements throughout.

The phrases "in one example," "according to one example," "in some examples," and the like generally mean that the particular feature, structure, or characteristic following the phrase may be included in at least one example of the present disclosure and may be included in more than one example of the present disclosure (importantly, such phrases do not necessarily refer to the same example).

If the specification states a component or feature "may," "can," "could," "should," "would," "preferably," "possibly," "typically," "optionally," "for example," "as an example," "in some examples," "often," or "might" (or other such language) be included or have a characteristic, that specific component or feature is not required to be included or to have the characteristic. Such component or feature may be optionally included in some examples, or it may be excluded.

The word "example" or "exemplary" is used herein to mean "serving as an example, instance, or illustration." Any implementation described herein as "example" or "exemplary" is not necessarily to be construed as preferred or advantageous over other implementations.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

The term "component" may refer to an article, a device, or an apparatus that may comprise one or more surfaces, portions, layers and/or elements. For example, an example component may comprise one or more substrates that may provide underlying layer(s) for the component, and may comprise one or more elements that may form part of and/or are disposed on top of the substrate. In the present disclosure, the term "element" may refer to an article, a device, or an apparatus that may provide one or more functionalities.

The term "flow sensing device" refers to an apparatus that may detect, measure, and/or identify flow rate(s) (including, but not limited to, linear flow velocity, nonlinear flow velocity, mass flow rate, and/or volumetric flow rate) of a flowing media or medium. In the present disclosure, the term "flowing media" refers to a substance (such as, but not limited to, liquid substance and/or gaseous substance).

The term "flow path" may refer to a passageway through which a flowing media may flow, traverse, or be conveyed. An example flow path of the present disclosure may be defined/formed by and/or comprise one or more channels. An example channel may define a plurality of sidewalls. In various examples of the present disclosure, example dimensions of example cross sections of an example flow path/channel may be in the microns to hundreds of microns in height and tens of microns to thousands of microns in width. In various examples of the present disclosure, example flow path/channels may be 4500 microns in width and 1500 microns in height to serve flow rates of up to 1000 milliliters per hour (mL/hr).

The term "laminar flow" may be characterized by particles of the flowing media following smooth path(s) in the flow path/channel with little or no mixing (i.e., high momentum diffusion and low momentum convection). In contrast, the term "turbulent flow" may be characterized by particles of the flowing media undergo irregular fluctuations or mixing. In some examples, a laminar flow for the flow sensing device may be achieved based on the flow rate of the flowing media. As described herein, examples of the present disclosure may be implemented in an infusion pump, where the flow rate may be less than a flow rate threshold (for example, between 0.02 milliliters per hour (mL/hr) and 0.5 mL/hr).

Flow sensing devices may be utilized in a variety of applications including micropipetting, high-performance liquid chromatography (HPLC) applications, medical devices (e.g., drug delivery, infusion pumps, dialysis pumps), and/or the like. For example, an example flow sensing device may be implemented in an invasive or non-invasive drug delivery system to detect, measure, and/or identify a flow rate of a flowing media associated with the invasive or non-invasive drug delivery system. In such an example, an infusion pump may be implemented to deliver substance(s) (such as, but not limited to, fluids, medications and/or nutrients) into a patient's body in an invasive drug delivery system. The substance(s) may need to be delivered in controlled amounts. As such, an example flow sensing device may be implemented in the infusion pump to detect, measure, and/or identify the flow rate of substance(s) that may be delivered to the patient. In various examples, the flow rate of a flowing media may need to be precisely measured. Continuing from the infusion pump example above, the flow rate of the substance(s) may need to be delivered at a low rate based on the condition of the patient and/or the treatment for the patient. For example, the substance(s) may need to be delivered at less than 5 milliliters per hour. If the flow rate is not precisely measured, a patient may be over-dosed or under-dosed, which may result in injuries, casualties, and/or deaths.

In some embodiments, a flow sensing device (e.g., a micro-electro-mechanical systems (MEMS) thermopile-based flow sensing device) may consist of a heating element and two temperature sensors (e.g., thermopiles) where each temperature sensor is positioned adjacent a side surface of the heating element. In some examples, a first temperature sensor may be positioned upstream with respect to the flow, while a second temperature sensor is positioned downstream with respect to the flow. The term downstream may refer to a location of a first component in a flow path/channel with respect to second component in the flow path/channel, based at least in part on the direction of flow of a flowing media within the flow path. For example, if a flowing media flows to component A, and subsequently flows to component B, then component B is downstream with respect to component A. Similarly, the term upstream may refer to a location of a first component in a flow path/channel with respect to second component in the flow path/channel, based at least in part on the direction of flow of a flowing media within the flow path/channel. For example, if a flowing media flows to component A, and subsequently flows to component B, then component A is upstream with respect to component B. In various examples, the temperature distribution (i.e., ΔT or dT) or temperature difference between the first temperature sensor and the second temperature sensor is calibrated to extract/determine flow rate information associated with a flowing media within the flow path/channel using electronic signal processing circuitry.

Referring now to FIG. 1, a schematic diagram depicting a perspective view of an example flow sensing device 100 in accordance with various embodiments of the present disclosure is provided. As depicted in FIG. 1, the flow sensing device 100 comprises a housing 101 and flow sensing component 103 (e.g., controller component, sense die, printed circuit board assembly (PCBA), and/or the like).

As depicted in FIG. 1, the housing 101 of the example flow sensing device 100 may be or comprise a tubular shaped member configured to convey a flowing media from an inlet 102 of the flow sensing device 100 to an outlet 104 of the flow sensing device 100. In various embodiments, the flow sensing device 100 may form part of and/or be connected to an external flow path/channel (e.g., via a first tube connected to the inlet 102 and a second tube connected to the outlet 104) such that a flowing media can be conveyed therethrough. In various embodiments, the inlet 102 and the outlet 104 may define or comprise slide-on fittings, luer-lock, Swage-Lock, and/or the like. In various embodiments, the example housing 101 may be or comprise plastic, biodegradable materials, poly(methyl methacrylate) (PMMA), cyclic olefine copolymers, polycarbonate, polystyrene, polyether ether ketone (PEEK), polytetrafluoroethylene (PTFE), liquid-crystal polymers (LCPs), polyetherimide (PEI), epoxy, PerFluoroAlkoxy (PFA), fluorinated ethylene propylene (FEP), combinations thereof, and/or the like.

As noted above, the example flow sensing device 100 comprises a flow sensing component 103. In various examples, a surface of the example housing 101 may be disposed adjacent a surface of the flow sensing component 103. For example, as depicted in FIG. 1, a bottom surface of the housing 101 of the flow sensing device 100 may be disposed adjacent and/or attached to a top surface of the flow sensing component 103. In various embodiments, the flow sensing component 103 may be in electronic communication with one or more elements of the flow sensing device 100. By way of example, the example flow sensing component 103 may be or comprise a sense die, transducer, and/or the like. Additionally, the flow sensing component 103 may comprise one or more additional elements, such as but not limited to one or more heating elements, temperature sensors, and/or the like. The example flow sensing component 103 may comprise a glass-reinforced epoxy laminate material (e.g., FR-4). In various embodiments, the example flow sensing component 103 may comprise epoxy, ceramic, alumina, LCPs, and/or the like. In some embodiments, a sense die may be connected to another element of the flow sensing component using wire bonds, bump bonds, or the like. The example flow sensing component 103 may comprise a thick film printed ceramic board, a laminate and/or other material. As depicted in FIG. 1, the example flow sensing component 103 comprises one or more electronic components thereon and/or pads for connecting to other electronic components of the flow sensing device 100 and/or other apparatuses. In some examples, the flow sensing component 103 may include an application specific integrated circuit (ASIC) that may be attached to a surface of the flow sensing component 103, such as an ASIC electrically coupled to the flow sensing component 103 via wire bonds, bump bonds, electrical terminals, and/or any other suitable electrical connections. Additionally, or alternatively, the example flow sensing component 103 may include one or more conductive pads for engaging circuitry and/or electronic components in communication with a remote processor or the like.

While the description above provides an example flow sensing device 100, it is noted that the scope of the present disclosure is not limited to the description above. In some examples, an example flow sensing device 100 may in accordance with the present disclosure may be in other forms. In some examples, an example flow sensing device 100 may comprise one or more additional and/or alternative elements, and/or may be structured/positioned differently than that illustrated in FIG. 1.

Figure 2:
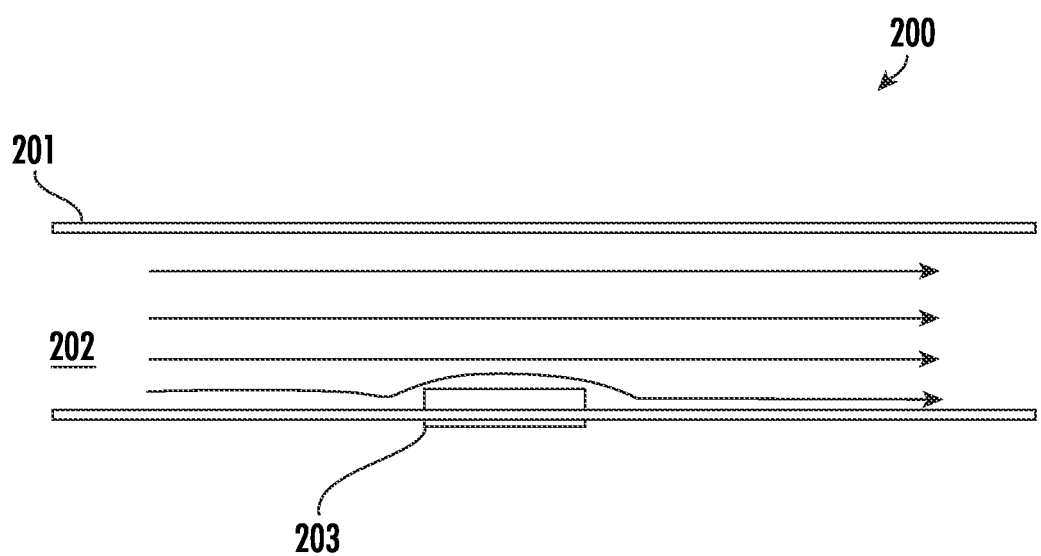
FIG. 2 illustrates a cross-sectional view of an example flow sensing device, in accordance with examples of the present disclosure.

Referring now to FIG. 2, a schematic diagram depicting an example flow sensing device 200 in accordance with various embodiments of the present disclosure is provided. As depicted in FIG. 2, the flow sensing device 200 comprises a housing 201 and a flow sensing component 203 (e.g., controller component, sense die, printed circuit board assembly (PCBA), and/or the like).

As depicted, the flow sensing device 200 comprises/defines a flow path/channel 202. The flow path/channel 202 may refer to a passageway beginning with an inlet and terminating at an outlet through which a flowing media may enter, flow through and be expelled from the flow sensing device 200. The flow path/channel 202 may be or comprise, for example, without limitation, a pipe, conduit, tubular structure, and/or the like. A flowing media (e.g., liquid, gas, and/or air) may enter an inlet disposed on a first surface of the example flow sensing device 200, travel through at least a portion of a flow path/channel 202, and exit the flow sensing device through an outlet disposed on another surface of the flow sensing device 200. In an invasive flow sensing device, a flowing media may come into direct contact with a flow sensing component 203 (e.g., thermal flow sense die) that is positioned within the flow path/channel 202 of the flow sensing device 200 such that the flow sensing component 203 can detect a flow rate thereof.

As depicted in FIG. 2, a flowing media or liquid may come into contact with at least a portion of the flow sensing component 203 (e.g., sense die) as it flows through the flow path/channel 202 of the flow sensing device (in some examples, such that a sense bridge or active area comes into direct contact with the flow sensing component 203 (e.g., sense die)). In some examples, as the flowing media or liquid flows adjacent at least one surface/edge of the flow sensing component 203 (e.g., sense die), localized disturbance/turbulence in the flow of the flowing media may be generated due to interactions of the flow sensing component 203 (e.g., sense die) and the flowing media or liquid. In some embodiments, the example flow sensing component 203 (e.g., sense die) may comprise a protective coating or layer (e.g., passivation layer such as a silicon nitrate passivation layer) that protects the flow sensing component 203 (e.g., sense die) and repels any flowing media or liquid. In some embodiments, as a flowing media or liquid flows across and/or over the flow sensing component 203, heat from a heating element or heater positioned nearby may flow in conjunction with the liquid and generate an asymmetric temperature flow profile. In various examples, a thin air gap adjacent a surface of the flow sensing component 203 may be tolerated, and the flow sensing device 200 may be appropriately calibrated to account for such air gaps. However, in an instance in which air gaps/bubbles are present in a flowing media (e.g., liquid) are present, the flow sensing device 200 may generate erroneous outputs and fail to accurately detect a flow rate of the sample flowing media.

In different applications, the flow sensing component 203 (e.g., sense die) may be or comprise a sense die having hydrophobic (e.g., repelling a flowing media/liquid) or hydrophilic (e.g., wetted by a flowing media/liquid) properties. In some examples, as noted above, when a liquid comes into contact with an example hydrophilic sense die surface, a thin air film may be present adjacent the sense die surface due to interaction of liquid surface tension to that of sense die surface energies. The presence of an air gap/void (e.g., that is in the microns to hundreds of microns in height) above a flow sensing component, such as a sense die, may cause many technical challenges and limitations. For example, the size/height of the gap/void may depend on an amount of surface tension over the surface of the flow sensing component. In the example of an invasive flow sensing device, a trapped air film (e.g., air bubble, gas bubble, and/or the like which are used interchangeably herein) in the flowing media (e.g., liquid) moving adjacent the flow sensing component may reduce the accuracy of measurements that are obtained using the flow sensing component and may negatively impact the sensitivity and/or resolution of flow measurements that are generated. In some embodiments, a flow sensing component (e.g., sense die) may be treated to become more hydrophilic in order to improve wettability. However, a contact angle with a flow sensing component/sense die surface may be inadequate to achieve suitable wettability of the flow sensing component/ sense die. Additionally, treating a flow sensing component/ sense die may involve additional processing steps that may significantly increase fabrication/manufacturing complexity and costs.

Figure 3A:
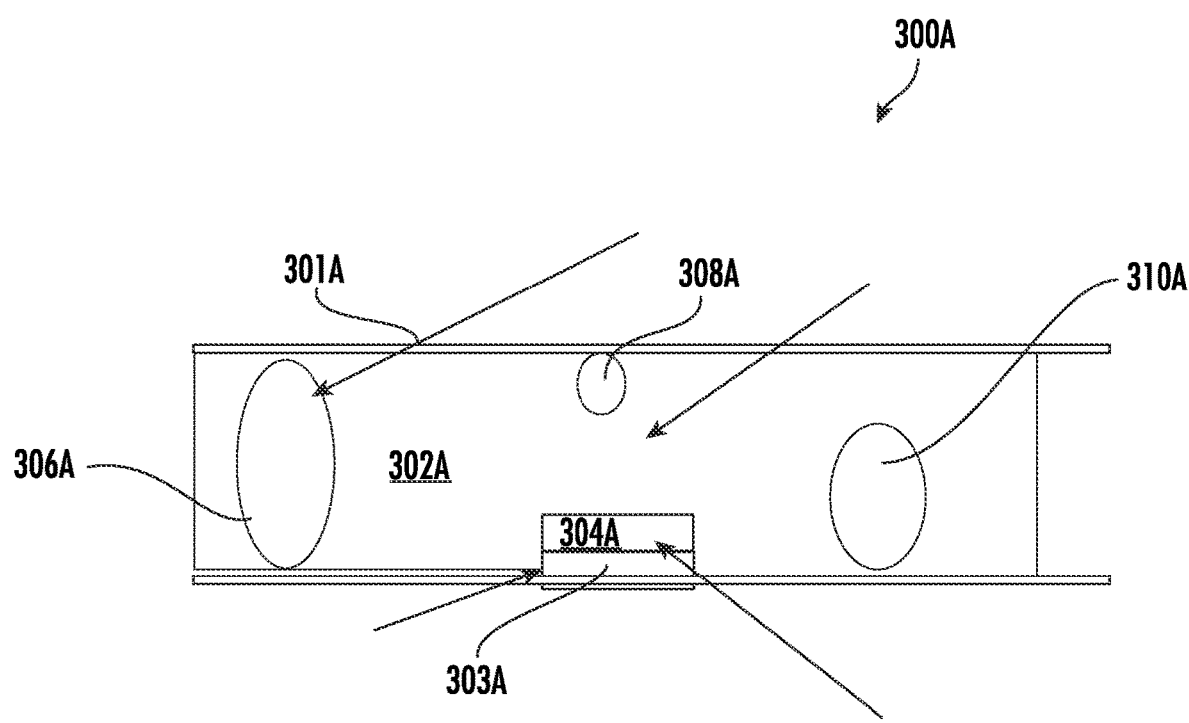
FIG. 3A illustrates a cross-sectional view of an example flow sensing device, in accordance with examples of the present disclosure.

Referring now to FIG. 3A, a schematic diagram depicting an example flow sensing device 300A in accordance with various embodiments of the present disclosure is provided. As depicted in FIG. 3A, the flow sensing device 300A comprises a housing 301A and a flow sensing component 303A (e.g., controller component, sense die, printed circuit board assembly (PCBA), and/or the like).

As depicted in FIG. 3A, the flow sensing device 300A comprises/defines a flow path/channel 302A. The flow path/ channel 302A may refer to a passageway beginning with an inlet and terminating at an outlet through which a flowing media may enter, flow through and be expelled from the flow sensing device 300A. A flowing media (e.g., liquid and/or air) may enter an inlet on a first surface of the example flow sensing device 300A, travel through at least a portion of a flow path/channel 302A, and exit the flow sensing device through an outlet on another surface of the flow sensing device 300A. As depicted in FIG. 3A, a flowing media or liquid may come into contact with at least a portion of the flow sensing component 303A (e.g., sense die) as it flows through the flow path/channel 302A of the flow sensing device 300A (in some examples, such that a sense bridge or active area comes into direct contact with the flow sensing component 303A (e.g., sense die)). In some examples, as the flowing media or liquid flows adjacent at least one surface/ edge of the flow sensing component 303A (e.g., sense die), localized disturbance/turbulence in the flow of the flowing media in the flow may be generated due to interactions of the flow sensing component 303A (e.g., sense die) and the flowing media or liquid.

As illustrated in FIG. 3A, in some examples, fluid located directly above a top surface of the flow sensing component 303A (e.g., sense die) may be displaced (e.g., with a force equal to surface tension of a sense die passivation layer), leaving an air gap 304A. In some examples, a vertical force associated with edge induced turbulence further increases a tension force on the flow sensing component 303A (e.g., sense die) surface to define the air gap 304A. The tension force may be balanced/countered by vertical force from a fluid column and fluid flow pressure. Thus, the equilibrium between the two forces may result in a particular thickness of the air gap 304A. In various examples, as long as the thickness of the air gap 304A is relatively consistent during surface interactions, the flow rate measurements detected/ generated using the flow sensing component 303A will be accurate.

As further depicted in FIG. 3A, the flowing media may comprise a plurality of air bubbles (as shown, at least a first air bubble 306A, a second air bubble 308A, and a third air bubble 310A) that may each flow through the flow path/ channel 302A along with the flowing media.

Figure 3B:
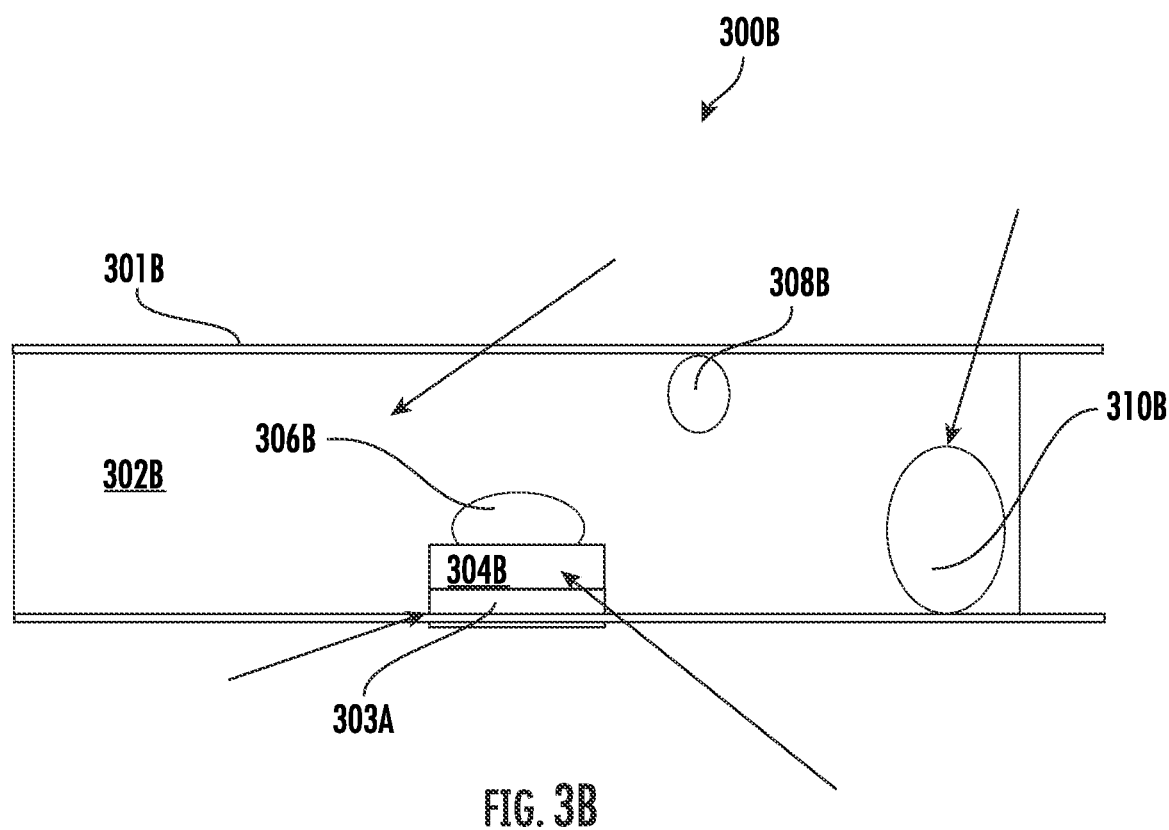
FIG. 3B illustrates a cross-sectional view of an example flow sensing device, in accordance with examples of the present disclosure.

Referring now to FIG. 3B, another schematic diagram depicting an example flow sensing device 300B in accordance with various embodiments of the present disclosure is provided. The flow sensing device 300B may be similar or identical to the flow sensing device 300A discussed above in connection with FIG. 3A. As depicted in FIG. 3B, the flow sensing device 300B comprises a housing 301 and a flow sensing component 303B (e.g., controller component, sense die, printed circuit board assembly (PCBA), and/or the like).

As depicted in FIG. 3B, the flow sensing device 300B comprises/defines a flow path/channel 302B. The flow path/ channel 302B may refer to a passageway beginning with an inlet and terminating at an outlet through which a flowing media may enter, flow through and be expelled from the flow sensing device 300B. A flowing media (e.g., liquid and/or air) may enter an inlet on a first surface of the example flow sensing device 300B, travel through at least a portion of a flow path/channel 302B, and exit the flow sensing device through an outlet on another surface of the flow sensing device 300B. As depicted in FIG. 3B, a flowing media or liquid may come into contact with at least a portion of the flow sensing component 303B (e.g., sense die) as it flows through the flow path/channel 302B of the flow sensing device 300B (in some examples, such that a sense bridge or active area comes into direct contact with the flow sensing component 303B (e.g., sense die)). In some examples, as the flowing media or liquid flows adjacent at least one surface/ edge of the flow sensing component 303B (e.g., sense die), localized disturbance/turbulence in the flow of the flowing media in the flow may be generated due to interactions of the flow sensing component 303B (e.g., sense die) and the flowing media or liquid.

As depicted in FIG. 3B, the flowing media comprises at least a first air bubble 306B, a second air bubble 308B, and a third air bubble 310B. As further depicted in FIG. 3B, in addition to the air gap 304B located directly above a top surface of the flow sensing component 303B (e.g., sense die) an air bubble may become trapped over/with the air gap 304B. As depicted, the first air bubble 306B is trapped adjacent (e.g., conjoined with, in contact with, or the like) the air gap 304B thereby increasing the overall size/thickness of the gap/void. In some embodiments, such unions between air bubbles and the prevalent air gap/air film over a flow sensing component/sense die may alter the effective air film thickness and result in flow rate measurement errors. In some cases, an example air bubble may be retained adjacent the air gap/air film may for a prolonged time period and may thus interfere with flow measurements for an extended time period. To solve these and other issues, techniques for detecting and providing indications in response to unwanted air bubbles that may be present in flow sensing devices (e.g., MEMS thermal flow sensors) are required.

In accordance with various embodiments of the present disclosure, example methods, apparatuses and systems are provided. In some examples, a flow sensing device is provided. The flow sensing device may comprise: a housing; a flow sensing component disposed at least partially within the housing, wherein the flow sensing component is configured to make direct contact with a flowing media in a flow path of the flow sensing device; and a controller component in electronic communication with the flow sensing component that is configured to: monitor at least one flow sensing component output, detect an air bubble at a location adjacent a surface of the flow sensing component based at least in part on the at least one flow sensing component output, and determine whether the air bubble satisfies an air bubble condition defining one or more predetermined characteristics. In some examples, the controller component is further configured to: in response to determining that the air bubble satisfies the air bubble condition, generate an air bubble indication. In some examples, monitoring the at least one flow sensing component output comprises: determining whether the at least one sensing component output is less than a previous value, and determining whether the at least one sensing component output is equal to a predetermined minimal value. In some examples, the flow sensing device is positioned such that an air gap is formed adjacent a surface of the flow sensing device when the flowing media makes direct contact therewith, and wherein at least one of the predetermined characteristics is associated with the air bubble being joined to the air gap. In some examples, the flow sensing component comprises at least one heating element, a first flow sensing element positioned upstream with respect to the at least one heating element, and a second flow sensing element positioned downstream with respect to the at least one heating element. In some examples, the flow sensing component comprises a sense die. In some examples, the controller component is configured to determine whether the air bubble satisfies an air bubble condition by: determining a first temperature output associated with the first flow sensing element; determining a second temperature output associated with the second flow sensing element; and comparing the first temperature output and the second temperature output. In some examples, the controller component is further configured to: in response to detecting the air bubble, initiate a bubble dwell timer; determine a minimum permissible dwell time value; retrieve a maximum allowable dwell time factor; and in an instance in which the maximum allowable dwell time value is less than an air bubble dwell time value, generate an air bubble retention indication. In some examples, the controller component is further configured to: in an instance in which the maximum allowable dwell time value is less than an end-of-flow factor, generate a second air bubble retention indication. In some examples, the end-of-flow factor is determined based at least in part on an estimated long flow void length in the flow path that is representative of an end-of-flow scenario.

In accordance with some embodiments of the present disclosure, a method is provided. The method may comprise: monitoring, by a controller component in electronic communication with a flow sensing component, at least one flow sensing component output, wherein the flow sensing component is disposed at least partially within a housing of a flow sensing device, and wherein the flow sensing component is configured to make direct contact with a flowing media in a flow path of the flow sensing device; detecting, by the controller component, an air bubble at a location adjacent a surface of the flow sensing component based at least in part on the at least one flow sensing component output; and determining, by the controller component, whether the air bubble satisfies an air bubble condition defining one or more predetermined characteristics. In some examples, the method comprises in response to determining that the air bubble satisfies the air bubble condition, generating, by the controller component, an air bubble indication. In some examples, monitoring the at least one flow sensing component output comprises: determining, by the controller component, whether the at least one sensing component output is less than a previous value, and determining, by the controller component, whether the at least one sensing component output is equal to a predetermined minimal value. In some examples, the flow sensing device is positioned such that an air gap is formed adjacent a surface of the flow sensing device when the flowing media makes direct contact therewith, and wherein at least one of the predetermined characteristics is associated with the air bubble being joined to the air gap. In some examples, the flow sensing component comprises at least one heating element, a first flow sensing element positioned upstream with respect to the at least one heating element, and a second flow sensing element positioned downstream with respect to the at least one heating element. In some examples, the flow sensing component comprises a sense die. In some examples, determining whether the air bubble satisfies an air bubble condition further comprises: determining, by the controller component, a first temperature output associated with the first flow sensing element; determining, by the controller component, a second temperature output associated with the second flow sensing element; and comparing, by the controller component, the first temperature output and the second temperature output. In some examples, the method comprises in response to detecting the air bubble, initiating, by the controller component, a bubble dwell timer; determining, by the controller component, a minimum permissible dwell time value; retrieving, by the controller component, a maximum allowable dwell time factor; and in an instance in which the maximum allowable dwell time value is less than an air bubble dwell time value, generating, by the controller component, an air bubble retention indication. In some examples, the method comprises: in an instance in which the maximum allowable dwell time value is less than an end-of-flow factor, generating, by the controller component, a second air bubble retention indication. In some examples, the end-of-flow factor is determined based at least in part on an estimated long flow void length in the flow path that is representative of an end-of-flow scenario.

Figure 4:
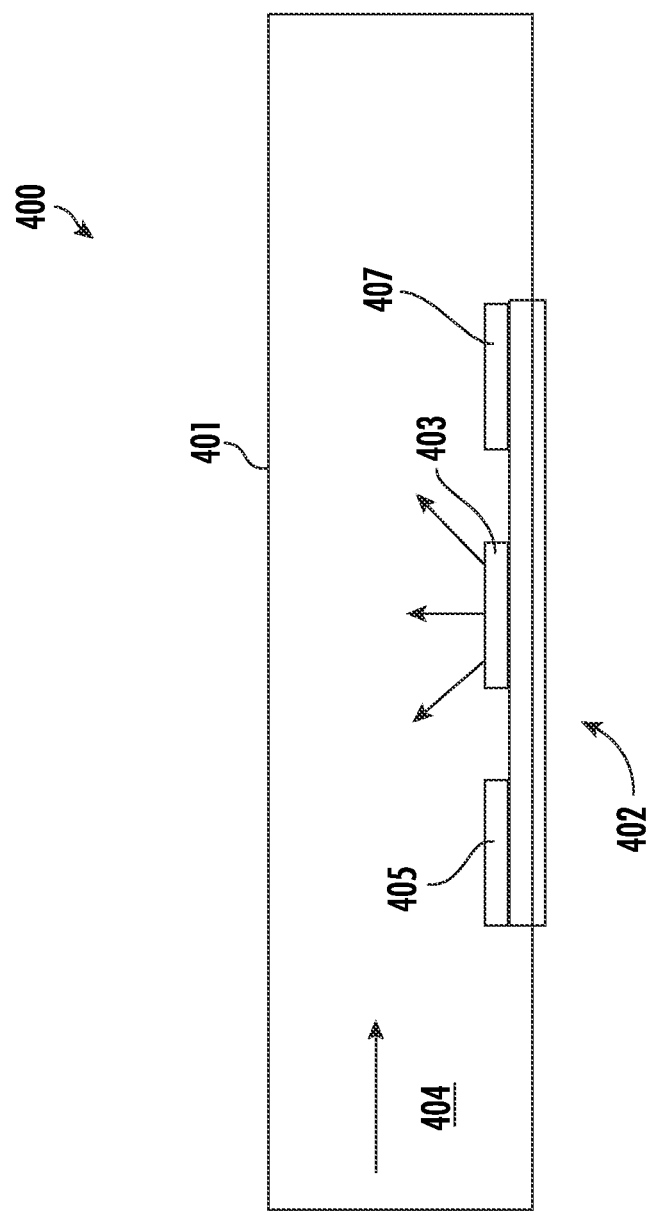
FIG. 4 illustrates a cross-sectional view of an example flow sensing device, in accordance with examples of the present disclosure.

Referring now to FIG. 4, a cross-sectional view depicting an example portion of a flow sensing device 400 in accordance with various embodiments of the present disclosure is provided. In particular, as depicted, the example flow sensing device 400 comprises a flow sensing component 402 (e.g., sense die). As illustrated, the flow sensing component 402 comprises a heating element 403, a first flow sensing element 405 and a second flow sensing element 407. The flow sensing device 400 may be similar or identical to the flow sensing devices 300A and 300B described above in connection with FIG. 3A and FIG. 3B.

As depicted, the flow sensing device 400 defines a housing 401 or other enclosure configured to at least partially support one or more of the first flow sensing element 405, the second flow sensing element 407, and/or the heating element 403. The first flow sensing element 405, the second flow sensing element 407, and the heating element 403 may be in thermal engagement with a flowing media disposed within at least a portion of the flow sensing device 400. As shown, the flow sensing device 400 comprises a tubular shaped member configured to convey a flowing media therethrough (e.g., from an inlet to an outlet of the flow sensing device 400). In various embodiments, the flow sensing device 400 may form part of and/or be connected to an external flow path/channel such that a flowing media can be conveyed therethrough.

An example air bubble may propagate through the example flow sensing device 400 in a particular direction. As depicted, the gas bubble may propagate through the example flow sensing device along a flow path 404. As the gas bubble moves through the flow sensing device 400, the first flow sensing element 405 and/or the second flow sensing element 407 may detect a change in temperature proximate the respective first and second flow sensing elements 405 and 407 (e.g., temperature sensors/thermopiles) due to a thermal conductivity change within the example flow sensing device 400.

As depicted in FIG. 4, the example flow sensing device 400/flow sensing component 402 comprises a heating element 403. In various examples, the heating element 403 may comprise any heat source configured to output thermal energy so as to heat or otherwise warm a flowing media within the flow sensing device 400 proximate the heating element 403. By way of example, the heating element may comprise a resistive heating element in which the passage of electrical current through a resistor produces heat. Although described herein with reference to a resistive heating element 403, the present disclosure contemplates that any heating element (e.g., radiator, film heater, conductive heater, convective heater, etc.) may be used so as to generate a thermal output (e.g., generate heat). In various embodiments, flow sensing device 400 further comprises a controller/heating control circuit that operates to maintain and/or control the thermal output of the heating element 403. For example, the heating element 403 may comprise a coil, a ribbon (including but not limited to, straight ribbon, corrugated ribbon), a plate, a wire strip, and/or a layer that may be connected to an electrical power source. In some examples, the heating element 403 may comprise various geometries, including but not limited to a meander, a meander with rounded corner, an S-shaped, an S-shaped rounded corner, a double spiral, a double spiral with rounded corner, a double spiral with irregular spacings, a plane plate with central square hole, a circular, a drive wheel, an elliptical, a honeycomb, or the like. When an electrical power source is turned on, electric current may flow through the coil, the ribbon, the plate, the wire strip, and/or the layer, which may in turn convert electrical energy to heat energy.

The example heating element 403 may be or comprise a high-temperature coefficient of resistance (TCR) material (e.g., Pt, NiFe, doped silicon/polysilicon, PtSi and other silicides, W, AlN, WN or the like). In some examples, the example heating element 403 may comprise nickel-based and/or iron-based material. For example, the heating element 403 may comprise one or more metal materials, such as nickel iron (NiFe) alloys, which may provide high temperature coefficients of electrical resistance. For example, the heating element 403 may comprise 81% nickel (Ni) and 19% iron (Fe), Permalloy. Additionally, or alternatively, the heating element 403 may comprise 60% Ni and 40% Fe. In some examples, the heating element 403 may comprise platinum, e.g., platinum in the form of a thin film heater due to its high temperature coefficient of resistance (TCR). In some examples, copper alloys with low thermal conductivity, such as alloy, may also be used for the heating element 403.

In some examples, the example controller/heating control circuit may operate so as to maintain a substantially (e.g., within applicable tolerances) constant thermal output of the heating element 403. Said differently, in some examples, the flow sensing device 400 may employ a heating element 403 with a substantially constant thermal output so as to stabilize the temperature data detected/generated by the first flow sensing element 405 and the second flow sensing element 407. In various embodiments, the controller may be co-located or remote from the flow sensing device 400.

As noted above, and as depicted in FIG. 4, the example flow sensing device 400/flow sensing component 402 comprises a first flow sensing element 405 (e.g., first temperature sensor) and a second flow sensing element 407 (e.g., second temperature sensor). In various examples, the first flow sensing element 405 may be configured to generate first temperature data/outputs. As depicted, the first flow sensing element 405 may be in thermal engagement with at least a portion of the flow sensing device 400 (e.g., in thermal engagement with a flowing media within the flow sensing device 400) so as to determine a temperature within the flow sensing device 400 proximate the first flow sensing element 405. In some embodiments, the first flow sensing element 405 may be positioned upstream (e.g., relative the flow path 404) of the heating element 403 and the second flow sensing element 407. By way of example, the first flow sensing element 405 may include a thermocouple, positive temperature coefficient (PTC) thermistor, negative temperature coefficient (NTC) thermistor, —p-n junction, resistor, and/or the like configured to determine the temperature of the fluid proximate the first flow sensing element 405. Although illustrated with a single first flow sensing element 405, the present disclosure contemplates that the first flow sensing element 405 may further comprise a pair of offset thermopiles configured to, alone or in combination, generate first temperature data. Said differently, although described herein with reference to a single first flow sensing element 405 for convenience of description, the present disclosure contemplates that the techniques herein may be applicable to any number of first sensing elements/temperature sensors 405 positioned at any location with respect to the flow sensing device 400.

As further depicted in FIG. 4, the flow sensing device 400 comprises a second flow sensing element 407 that may be configured to generate second temperature data/outputs. As shown, the second flow sensing element 407 may be in thermal engagement with the flow sensing device 400 (e.g., in thermal engagement with a flowing media within the flow sensing device 400) so as to determine a temperature within the flow sensing device 400 proximate the second flow sensing element 407. In some embodiments, the second flow sensing element 407 may be positioned downstream (e.g., relative the flow path 404) of the heating element 403 and the first flow sensing element 405. By way of example, the second flow sensing element 407 may also include a thermocouple, positive temperature coefficient (PTC) thermistor, negative temperature coefficient (NTC) thermistor, p-n junction, resistor, and/or the like configured to determine the temperature of the fluid proximate the second flow sensing element 407. Although illustrated with a single second flow sensing element 407, the present disclosure contemplates that the second flow sensing element 407 may further comprise a pair of offset thermopiles configured to, alone or in combination, generate second temperature data. Said differently, although described herein with reference to a single second flow sensing element 407 for convenience of description, the present disclosure contemplates that the techniques herein may be applicable to any number of second flow sensing elements 407/temperature sensors positioned at any location with respect to the flow sensing device 400.

In some example embodiments, the first flow sensing element 405 and/or the second flow sensing element 407 (or their equivalent functionality) may be positioned on the heating element 403. Said differently, the generation of temperature data as described herein may, in some embodiments, refer to temperature data generated near or on the heating element 403. By way of example, as an air bubble/gas bubble passes by or traverses proximate the heating element 403, the resistance of the heating element 403 may also change due, at least in part, to the differences in heat capacity and thermal conductivity between gases and liquids as described herein. As the example gas bubble moves over a heating element 403 (e.g., a resistive heater) the temperature of the heating element 403 may increase, and the heating element's 403 resistance will change based on the temperature coefficient of resistance of the material of the heating element 403. In some examples, the flowing media may travel through a sensing region that may comprise the heating element 403, the first flow sensing element 405 and the second flow sensing element 407. For example, the first flow sensing element 405 is positioned in an upstream direction relative to the heating element 403. The second flow sensing element 407 is positioned in a downstream direction relative to the heating element 403. Accordingly, the first flow sensing element 405 may detect a first temperature of the flowing media. Subsequently, the flowing media may be heated by the heating element 403, which may increase the temperature of the flowing media by a predetermined amount. Subsequently, the second flow sensing element 407 may detect a second temperature of the flowing media. As the flow rate of the flowing media increases, more heat may be lost as the flowing media travels from the heating element 403 to the second flow sensing element 407. By comparing the difference between the first temperature and the second temperature with the predetermined amount, a flow rate of the flowing media may be calculated/determined.

While the description above provides some examples of flow sensing elements/temperature sensors, it is noted that the scope of the present disclosure is not limited to the description above. In some examples, an example temperature sensor may comprise one or more additional and/or alternative element(s), one or more additional and/or alternative material(s), and/or may be in other form(s). For example, an example temperature sensor may comprise at least one temperature sensing circuit, such as, but not limited to, resistors in a Wheatstone bridge circuit, or temperature sensitive diodes. In the example of a Wheatstone bridge circuit, two resistor branches may be provided, and each resistor branch may comprise two resistor elements. As temperature may affect the electrical resistance of the resistor element, an example temperature sensor may detect, measure, and/or identify the resistance change between the two resistor branches to determine the corresponding thermal energy.

While the description above provides an example flow sensing device 400, it is noted that the scope of the present disclosure is not limited to the description above. In some examples, an example flow sensing device 400 may in accordance with the present disclosure may be in other forms. In some examples, an example flow sensing device 400 may comprise one or more additional and/or alternative elements, and/or may be structured/positioned differently than that illustrated in FIG. 4. For example, an example flow sensing component may comprise less than two or more than two temperature sensors.

In some examples, the distance that temperature sensors are spaced from the heating element may be chosen in order to achieve an acceptable accuracy of flow rate measurements across an acceptably wide range of flow rates and/or for a desired range of flow rates (e.g., low flow rates between about 1 µL/hour and about 10,000 µL/hour). In some embodiments, the number of temperature sensors may also be chosen such that the accuracy of flow rate measurement for a desired flow rate range is achieved. In some examples, using only a single temperature sensor may lead to a tailing off of accuracy or precision at some flow rates, such as low flow rates. In some examples, using two temperature sensors spaced at different distances from the heating element may lead to an increased accuracy at low flow rates or the like. Without wishing to be bound by any particular theory, the increased accuracy or precision at low flow rates or the like may be due to differences in peak accuracy for a closer temperature sensor and peak accuracy for a further temperature sensor. In some examples, a closer temperature sensor may be more well suited for accurate and/or precise measurement of higher flow rates since a higher flow rate of media may increase the heat sink capacity of the media in the flow path of the example flow sensing device. In some examples, a further temperature sensor may be more well suited for accurate and/or precise measurement of lower flow rates since a lower flow rate of media may decrease the heat sink capability of the media and differences in temperature may be more easily detected by the further positioned temperature sensor.

In some examples, when temperature sensors may comprise thermopiles made up of a plurality of thermocouples, it may be helpful to use more thermocouples in a thermopile because the use of more thermocouples may increase the sensitivity of thermopile to temperature changes, which can increase the sensitivity of the flow rate sensor. In some examples, e.g., for a digital sensor, this can improve accuracy in a number of bits that represent a measured voltage value.

While the description above provides some examples of temperature sensors, it is noted that the scope of the present disclosure is not limited to the description above. In some examples, an example temperature sensor may comprise one or more additional and/or alternative element(s), one or more additional and/or alternative material(s), and/or may be in other form(s). For example, an example temperature sensor may comprise at least one temperature sensing circuit, such as, but not limited to, resistors in a Wheatstone bridge circuit, or temperature sensitive diodes.

In some examples, temperature sensors may be disposed in a separate layer of the sensor component from the layer in which the heating element is located. In some examples, the separate layer of the sensor component comprising temperature sensors may comprise one or more suitable material(s), including but not limited to, silicon nitride, silicon oxide, silicon oxynitride, a polymer, or other electrically insulating thin films. In some examples, the separate layer of the flow sensing component comprising temperature sensors may be an encapsulating layer that may protect temperature sensors. In some examples, the encapsulating layer may be electrically insulating.

In some examples, temperature sensors may be electronically coupled to one or more other elements (for example, an electrical power source, a processor) based on techniques such as, but not limited to, through-glass via (TGV), through-silicon via (TSV), and/or aerosol or ink jet printing. Additionally, or alternatively, temperature sensors may be electronically coupled to one or more other elements through other means.

Figure 5:
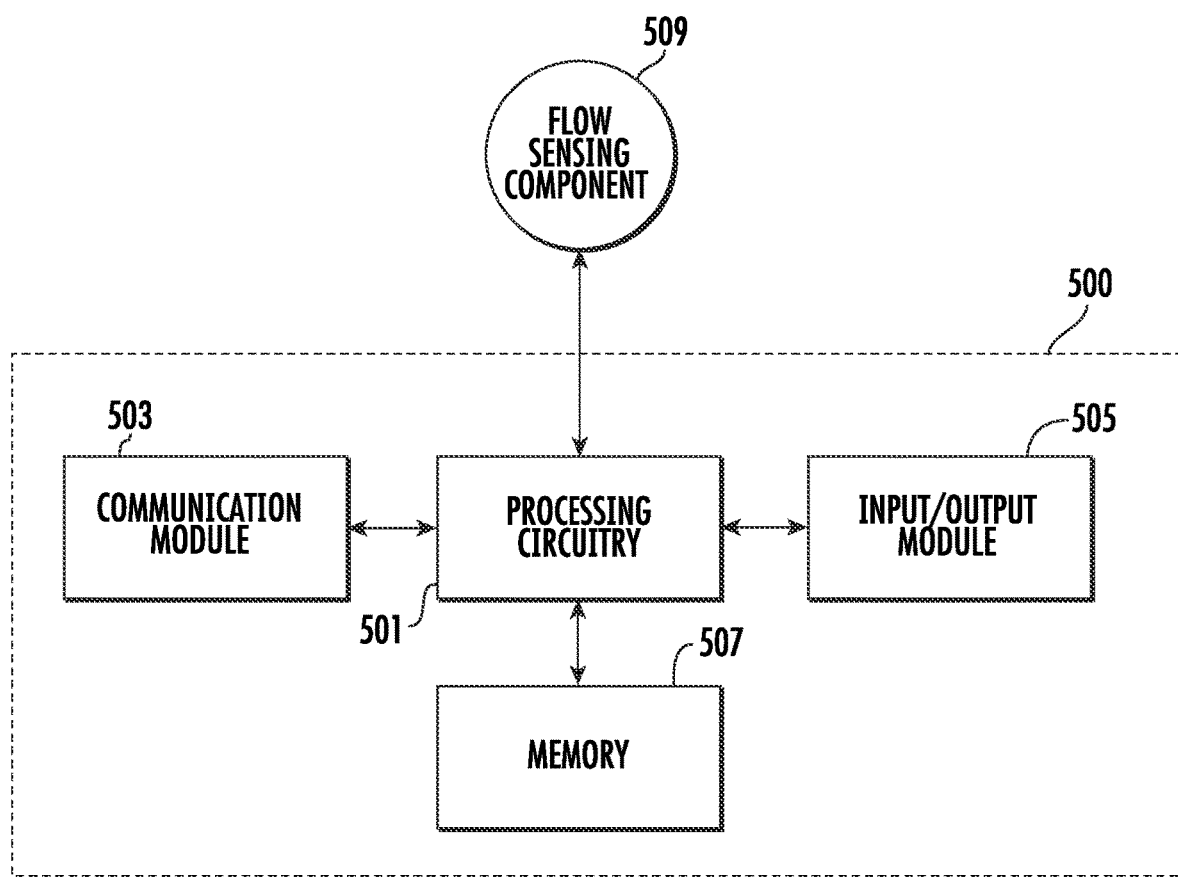
FIG. 5 illustrates an example controller component in electronic communication with an example apparatus in accordance with various embodiments of the present disclosure.

Referring now to FIG. 5, a schematic diagram depicting an example controller component 500 of an example apparatus in electronic communication with various other components in accordance with various embodiments of the present disclosure. As shown, the controller component 500 comprises processing circuitry 501, a communication module 503, input/output module 505, a memory 507 and/or other components configured to perform various operations, procedures, functions or the like described herein.

As shown, the controller component 500 (such as the processing circuitry 501, communication module 503, input/output module 505 and memory 507) is electrically coupled to and/or in electronic communication with a flow sensing component 509. As depicted, the flow sensing component 509 may exchange (e.g., transmit and receive) data with the processing circuitry 501 of the controller component 500.

The processing circuitry 501 may be implemented as, for example, various devices comprising one or a plurality of microprocessors with accompanying digital signal processors; one or a plurality of processors without accompanying digital signal processors; one or a plurality of coprocessors; one or a plurality of multi-core processors; one or a plurality of controllers; processing circuits; one or a plurality of computers; and various other processing elements (including integrated circuits, such as ASICs or FPGAs, or a certain combination thereof). In some embodiments, the processing circuitry 501 may comprise one or more processors. In one exemplary embodiment, the processing circuitry 501 is configured to execute instructions stored in the memory 507 or otherwise accessible by the processing circuitry 501. When executed by the processing circuitry 501, these instructions may enable the controller component 500 to execute one or a plurality of the functions as described herein. No matter whether it is configured by hardware, firmware/software methods, or a combination thereof, the processing circuitry 501 may comprise entities capable of executing operations according to the embodiments of the present invention when correspondingly configured. Therefore, for example, when the processing circuitry 501 is implemented as an ASIC, an FPGA, or the like, the processing circuitry 501 may comprise specially configured hardware for implementing one or a plurality of operations described herein. Alternatively, as another example, when the processing circuitry 501 is implemented as an actuator of instructions (such as those that may be stored in the memory 507), the instructions may specifically configure the processing circuitry 501 to execute one or a plurality of algorithms and operations described herein, such as those discussed with reference to FIG. 6.

The memory 507 may comprise, for example, a volatile memory, a non-volatile memory, or a certain combination thereof. Although illustrated as a single memory in FIG. 5, the memory 507 may comprise a plurality of memory components. In various embodiments, the memory 507 may comprise, for example, a hard disk drive, a random access memory, a cache memory, a flash memory, a Compact Disc Read-Only Memory (CD-ROM), a Digital Versatile Disk Read-Only Memory (DVD-ROM), an optical disk, a circuit configured to store information, or a certain combination thereof. The memory 507 may be configured to store information, data, application programs, instructions, and etc., so that the controller component 500 can execute various functions according to the embodiments of the present disclosure. For example, in at least some embodiments, the memory 507 is configured to cache input data for processing by the processing circuitry 501. Additionally, or alternatively, in at least some embodiments, the memory 507 is configured to store program instructions for execution by the processing circuitry 501. The memory 507 may store information in the form of static and/or dynamic information. When the functions are executed, the stored information may be stored and/or used by the controller component 500.

The communication module 503 may be implemented as any apparatus included in a circuit, hardware, a computer program product or a combination thereof, which is configured to receive and/or transmit data from/to another component or apparatus. The computer program product comprises computer-readable program instructions stored on a computer-readable medium (for example, the memory 507) and executed by a controller component 500 (for example, the processing circuitry 501). In some embodiments, the communication module 503 (as with other components discussed herein) may be at least partially implemented as the processing circuitry 501 or otherwise controlled by the processing circuitry 501. In this regard, the communication module 503 may communicate with the processing circuitry 501, for example, through a bus. The communication module 503 may comprise, for example, antennas, transmitters, receivers, transceivers, network interface cards and/or supporting hardware and/or firmware/software, and is used for establishing communication with another apparatus. The communication module 503 may be configured to receive and/or transmit any data that may be stored by the memory 507 by using any protocol that can be used for communication between apparatuses. The communication module 503 may additionally or alternatively communicate with the memory 507, the input/output module 505 and/or any other component of the controller component 500, for example, through a bus.

In some embodiments, the controller component 500 may comprise an input/output module 505. The input/output module 505 may communicate with the processing circuitry 501 to receive instructions input by the user and/or to provide audible, visual, mechanical or other outputs to the user. Therefore, the input/output module 505 may comprise supporting devices, such as a keyboard, a mouse, a display, a touch screen display, and/or other input/output mechanisms. Alternatively, at least some aspects of the input/output module 505 may be implemented on a device used by the user to communicate with the controller component 500. The input/output module 505 may communicate with the memory 507, the communication module 503 and/or any other component, for example, through a bus. One or a plurality of input/output modules and/or other components may be included in the controller component 500.

For example, the flow sensing component 509 may be similar to flow sensing component 402 described above with regard to FIG. 4. For example, flow sensing component 509 may generate a flow rate indication and transmit the flow rate indication to the processing circuitry 501.

Figure 6:
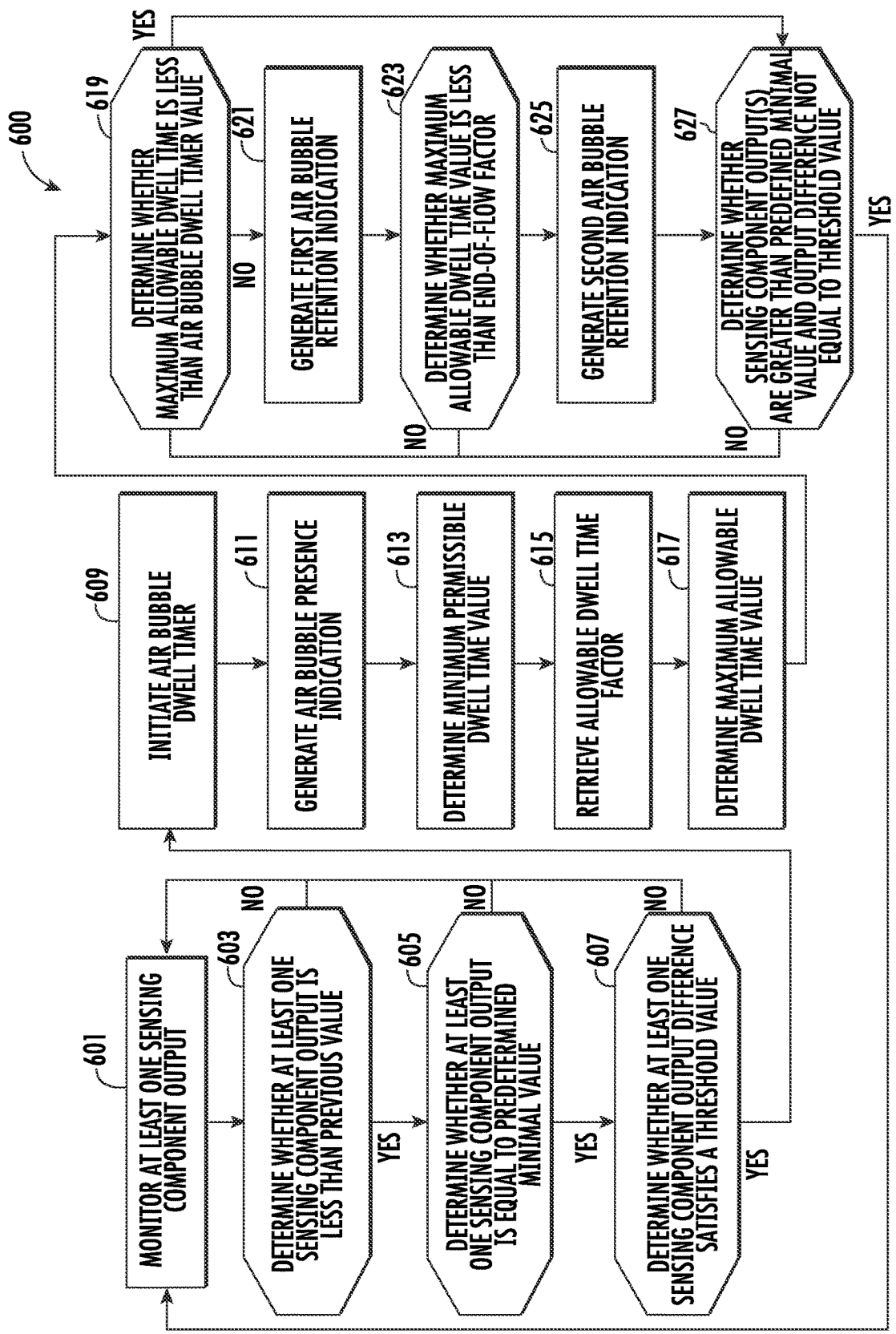
FIG. 6 is a flowchart diagram illustrating example operations in accordance with various embodiments of the present disclosure.

Referring now to FIG. 6, a flowchart diagram illustrating example operations 600 in accordance with various embodiments of the present disclosure is provided.

In some examples, the method 600 may be performed by a processing circuitry (for example, but not limited to, an application-specific integrated circuit (ASIC), a central processing unit (CPU)). In some examples, the processing circuitry may be electrically coupled to and/or in electronic communication with other circuitries of the example apparatus, such as, but not limited to, a humidity flow sensing component, a dehumidifier component, a gas detecting, a memory (such as, for example, random access memory (RAM) for storing computer program instructions), and/or a display circuitry (for rendering readings on a display).

In some examples, one or more of the procedures described in FIG. 6 may be embodied by computer program instructions, which may be stored by a memory (such as a non-transitory memory) of a system employing an embodiment of the present disclosure and executed by a processing circuitry (such as a processor) of the system. These computer program instructions may direct the system to function in a particular manner, such that the instructions stored in the memory circuitry produce an article of manufacture, the execution of which implements the function specified in the flow diagram step/operation(s). Further, the system may comprise one or more other circuitries. Various circuitries of the system may be electronically coupled between and/or among each other to transmit and/or receive energy, data and/or information.

In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

As noted above, in various embodiments, the presence of a thin air film over a flow sensing component (e.g., sense die) due to surface hydrophobicity or a degree of hydrophilicity may result in a thin boundary layer that reduces flow friction in relation to a flowing media and provides a predictable thermal interface for flow sensing components (e.g., sensing components, heating elements, temperature sensors, including thermopiles and the like which may be disposed on a MEMS flow sense die). With these conditions, the flow sensing device may be calibrated for a particular flow rate range. Any change in air film thickness may induce a flow rate measurement error. For example, when an air/gas bubble within a flowing media (e.g., liquid) passes over a flow sensing component (e.g., sense die), there may be an abrupt reduction in thermal conductivity resulting in a lower sensing component output (e.g., thermopile output). In some examples, a signal difference between upstream and downstream sensing components (e.g., dT) may be close to zero. The processing of such signals may be used to detect a presence of an air/gas bubble in a flow sensing device flow path and trigger generation of control indications/alerts. In various embodiments, an algorithm may be implemented via an electronic controller with inputs from flow sensing components (e.g., thermopiles or temperature sensors) using preset/stored parameters to identify various conditions, as discussed in more detail below. For example, a flow sensing device may be configured to detect an air bubble at a location adjacent a surface of the flow sensing component based at least in part on a flow sensing component output and determine whether the air bubble satisfies an air bubble condition defining one or more predetermined characteristics.

The example method 600 begins at step/operation 601. At step/operation 601, a processing circuitry (such as, but not limited to, the processing circuitry 501 of the controller component 500 illustrated in connection with FIG. 5, discussed above) monitors one or more sensing component outputs (e.g., thermopile outputs). For example, processing circuitry may monitor a first sensing element output and a second sensing element output. The first sensing component and the second sensing component may be similar or identical to the first flow sensing element 405 and the second flow sensing element 407 discussed above in relation to FIG. 4. In particular, the first flow sensing element 405 and the second flow sensing element 407 may be positioned upstream and downstream, respectively, in relation to a heating element (e.g., heating element 403). The processing circuitry may monitor at least one sensing component output for abrupt changes, for example, from a prevailing value to a predefined minimal value ('$T_{low}$'), and to identify an instance in which the temperature distribution (dT) (e.g., between two sensing elements) is close to zero. In an instance in which the above-conditions are satisfied, processing circuitry may determine that an air/gas bubble is present in the flow path of the flow sensing device and adjacent (e.g., over, close to, or the like) the flow sensing component (e.g., sense die).

In some embodiments, as discussed below, processing circuitry determines that there is an air bubble pass condition based at least in part on detecting that: (i) a flow sensing component/thermopile output voltage is lower than a previous value, (ii) the flow sensing component/thermopile output voltage is equal to a predefined minimal value (e.g., '$T_{low}$'), and (iii) the flow sensing component/thermopile output voltage (e.g., dT) variance satisfies a threshold value (e.g., is close to zero or 0.01 millivolts (mV)).

Subsequent to step/operation 601, the method 600 proceeds to step/operation 603. At step/operation 603, in some embodiments, processing circuitry determines whether the at least one flow sensing component output is less than a previous value.

Subsequent to step/operation 603, the method 600 proceeds to step/operation 605. At step/operation 605, in some embodiments, processing circuitry determines whether the at least one flow sensing component output is equal to a predetermined minimal value.

Subsequent to step/operation 605, the method 600 proceeds to step/operation 607. At step/operation 607, in some embodiments, processing circuitry determines whether the at least one flow sensing component output (e.g., dT) variance satisfies a threshold value (e.g., is equal to 0.01 mV).

In various examples, the processing circuitry may sequentially determine (e.g., check) whether at least one sensing component output changes from a prevailing value to a new low value in order to determine whether there is a flowing media disposed within the flow path of a flow sensing device. For example, in response to detecting that the at least one flow sensing component output is a predefined minimal value (e.g., '$T_{low}$') or within a predefined minimal range, processing circuitry may determine that there is no flowing media disposed within the flow sensing device (i.e., an empty tube or no fluid condition). As another example, the predefined minimal value $T_{low}$ comprises a difference of upstream and downstream temperature sensor output, which may be a fraction of degree Celsius (e.g., 0.1 C and a corresponding voltage difference may be equal to 0.01 mV for a given thermopile stack).

Subsequent to step/operation 607, the method 600 proceeds to step/operation 609. At step/operation 609, and in response to determining or identifying an air bubble condition (e.g., an air bubble is present or passing) based at least in part on the preceding steps/operations, processing circuitry initiates a bubble dwell timer (e.g., '$t_d$'). For example, processing circuitry may trigger activating a timer or timing mechanism to measure a time period associated with a detected air/gas bubble in response to detecting an air bubble.

Subsequent to step/operation 609, the method 600 proceeds to step/operation 611. At step/operation 611, and further in response to determining or identifying an air bubble condition, processing circuitry generates (e.g., transmits, sends, triggers, and/or the like) an air bubble presence indication (e.g., an alert relating to the presence of an air/gas bubble adjacent, on, near, close to, a flow sensing component).

Subsequent to step/operation 611, the method 600 proceeds to step/operation 613. At step/operation 613, processing circuitry determines a minimum permissible dwell time value for the detected air/gas bubble. For example, processing circuitry may determine the minimum permissible dwell time value based at least in part on a previous flow rate value and dimensions (e.g., a width) of the flow sensing component (e.g., sense die). The minimum permissible dwell time value may define a time period within which an air/gas bubble can stray while passing along with a flowing media. For example, processing circuitry may determine a minimum permissible dwell time, 'tpd' using the following equation:

$$tpd = \text{sense die width}/\text{flow rate}$$

where:
sense die width=sense die width parallel to flow direction (e.g., 1.064 mm); and
flow rate=prevailing measurement value from the sensor.

Subsequent to step/operation 613, the method 600 proceeds to step/operation. At step/operation 615, processing circuitry retrieves (e.g., obtains, fetches, or the like) a minimum allowable dwell time factor (e.g., 'S') as per calculated dwell time from a preset value set. In some embodiments, processing circuitry the allowable dwell time factor, 'S,' is a preset value that is determined based at least in part on a detected/prevailing flow rate of a flowing media.

In some embodiments, the allowable dwell time factor, 'S,' can be determined from a test where a regression linear equation is determined from range $t_{pd}$ and for possible lengths of air bubble. The value of 'S' may be determined by using the following equation:

$$S = A*tpd + B*L\text{bubble} + C$$

where:
tpd=minimum permissible dwell time for a given flow rate;
$L_{bubble}$=length of bubble; and
A, B, C are regression coefficients.

In some embodiment, the value of S may be configured based on a particular application (flow range). For example, a given application such as infusion pump flow rate measurement may include conducting a factory test to determine S, that can be a preset value. One such value could be 10 for flow rates of 1 to 1000 mL/hr for bubble lengths ranging from 0.5 mm, upto 50 mm.

Subsequent to step/operation 615, the method 600 proceeds to step/operation 617. At step/operation 617, processing circuitry determines a maximum allowable dwell time value (e.g., '$t_{md}$'). In some embodiments, processing circuitry determines the maximum allowable dwell time value using the following equation:

$$t_{md} = S*t_{pd}$$

where:
S=minimum allowable dwell time factor; and
$t_{md}$=maximum allowable dwell time value.

Subsequent to step/operation 617, the method 600 proceeds to step/operation 619. At step/operation 619, processing circuitry determines whether the maximum allowable dwell time value is less than the current bubble dwell timer value (e.g., $t_d$). Said differently, the processing circuitry determines whether $t_{md} < t_d$.

Subsequent to step/operation 619, the method 600 proceeds to step/operation 621. At step/operation 621, in an instance in which the maximum allowable dwell time value is greater than the current bubble dwell timer value (i.e., $t_{md} > t_d$), processing circuitry determines that an air bubble is currently trapped/retained adjacent, on, or over a flow sensing component (e.g., sense die) for a time period that meets or exceeds an allowable dwell time value for the given flow rate. In such examples, at step/operation 621, processing circuitry generates a first air bubble retention indication. However, in an instance in which processing circuitry determines that the maximum allowable dwell time value is lower than the current bubble dwell timer value, the method 600 proceeds to step/operation 627.

Subsequent to step/operation 621, the method 600 proceeds to step/operation 623. At step/operation 623, in order to distinguish between an air bubble retention condition and an end-of-flow condition/scenario, processing circuitry determines whether the maximum allowable dwell time value ('$t_{md}$') is less than an end-of-flow factor, 'EF.' In some embodiments, the end-of-flow factor is determined based at least in part on an estimated long flow void length in a flow path that is representative of an end-of-flow scenario. In some examples, a flow void length may be 30 centimeters (cm) long.

In some embodiments, the end-of-flow factor, 'EF,' can be determined from a test where a regression linear equation is determined from range $t_{pd}$ and for possible lengths of end-of-flow voids. The end-of-flow factor, 'EF' may be determined by using the following equation:

$$EF = D*tpd + E*L\text{flow voids} + F$$

where:
tpd=minimum permissible dwell time for a given flow rate;
$L_{flow\ voids}$=length of bubble; and
D, E, F are regression coefficients.

In some embodiment, the value of EF may be preset by a manufacturer based on a particular application (flow range). For example, a given applications such as Infusion Pump flow rate measurement, a factory test will be conducted to determine EF, that can be a preset value. One such value could be 50 for flow rates of 1 to 1000 ml/hr for end of flow void lengths ranging from 50 mm to 300 mm.

Subsequent to step/operation 623, the method 600 proceeds to step/operation 625. At step/operation 625, in an instance in which processing circuitry determines that the maximum allowable dwell time value is less than an end-of-flow factor, processing circuitry generates a second air bubble retention indication.

Subsequent to step/operation 625, the method 600 proceeds to step/operation 627. At step/operation 627, in some examples, processing circuitry determines whether: (i) the at least one flow sensing component output is greater than a predefined minimal value (e.g., '$T_{low}$'), and (ii) the flow sensing component/thermopile output voltage variance (e.g., dT) is equal to 0.01 mV. In an instance in which processing circuitry determines that the flow sensing component output fails to satisfy or meet the predefined minimal value and the voltage variance does not satisfy a threshold value or range (e.g., is not equal to 0.01 mV), the method 600 returns to step/operation 601 and processing circuitry continues to monitor one or more sensing component outputs (e.g., thermopile outputs). However, in an instance in which processing circuitry determines that the flow sensing component output satisfies or meets a predefined minimal value and the voltage variance (dT) is equal to 0.01 mV, the method 600 returns to step/operation 619

Using the techniques disclosed herein, unwanted air/gas bubble conditions that are likely to generate flow measurement errors can be detected. For example, an air/gas bubble may be present in a flow path where a flow sensing component (thermal flow sense die) is configured to invasively make direct contact with a flowing media (e.g., liquid, fluid, or the like). In accordance with some embodiments of the present disclosure, invasive/direct placement of a flow sensing component (e.g., sense die) within a flow path may reduce a thermal sensor heater drive current while maintain improved flow rate sensitivity. As discussed herein, the effect of micro turbulences from sense die edge interactions with an upstream flow over an example sense die, along with sense die hydrophobic force on the sense die may result in a thin air film which serves as a dynamic flow boundary layer between the sense die and flow to reduce flow friction as compared to a thermal separation layer. Certain embodiments of the present disclosure provide for detecting air/gas bubbles in a flowing media originating from a flowing media while it is passing adjacent or over a flow sensing component (e.g., sense die) based at least in part on abrupt changes in temperature sensor output(s) when compared with previously measured values and where each temperature sensor output is less than or equal to a predetermined value that is equal to an air bubble presence temperature value. Additionally, as described here, aspects of the present disclosure facilitate differentiation between a passing air bubble and an air bubble that is trapped within an air film adjacent or over a flow sensing component/sense die. In some embodiments, aspects of the present disclosure provide techniques for detecting an end-of-flow condition and generating an indication/alert associated therewith.

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, systems, subsystems, apparatuses, techniques, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatuses and systems described herein, various other components may be used in conjunction with the components and structures disclosed herein. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying drawings, and in some cases one or more of the steps depicted may occur substantially simultaneously, or additional steps may be involved. Although specific terms are employed herein, they are used in a generic and descriptive sense only and not for purposes of limitation.

What is claimed is:

1. A flow sensing device comprising:
   a housing;
   a flow sensing component disposed at least partially within the housing, wherein the flow sensing component is configured to make direct contact with a flowing media in a flow path of the flow sensing device; and a controller component comprises a processing circuit and a memory in electronic communication with the flow sensing component that is configured to:
monitor at least one flow sensing component output from the flow sensing component,
detect an air bubble at a location adjacent a surface of the flow sensing component based at least in part on the at least one flow sensing component output, wherein monitoring the at least one flow sensing component output comprises:
determining whether the at least one flow sensing component output is less than a previous value of the at least one flow sensing component output; and
determining whether the at least one flow sensing component output is equal to a predetermined minimal value;
determine an air bubble pass condition based on the at least one flow sensing component output being equal to the predetermined minimal value;
in response to determining the air bubble pass condition, initiate a bubble dwell timer;
in response to determining the air bubble pass condition, generate an indication that the air bubble is present at a location adjacent the surface of the flow sensing component;
determine a minimum permissible dwell time value based on a previous flow rate value and a width of the flow sensing component;
retrieve a maximum allowable dwell time value; and
in an instance in which the maximum allowable dwell time value is greater than an air bubble dwell time value, generate an air bubble retention indication.

2. The flow sensing device of claim 1, wherein the controller component is further configured to:
in response to determining that the air bubble satisfies the air bubble pass condition, generate an air bubble indication.

3. The flow sensing device of claim 1, wherein the flow sensing device is positioned such that an air gap is formed adjacent the surface of the flow sensing device when the flowing media makes direct contact therewith, and wherein the controller component is configured to determine whether the air bubble being joined to the air gap based on the air bubble pass condition.

4. The flow sensing device of claim 1, wherein the flow sensing component comprises at least one heating element, a first flow sensing element positioned upstream with respect to the at least one heating element, and a second flow sensing element positioned downstream with respect to the at least one heating element.

5. The flow sensing device of claim 4, wherein the flow sensing component comprises a sense die.

6. The flow sensing device of claim 4, wherein the controller component is configured to determine whether the air bubble satisfies an air bubble condition by:
determining a first temperature output associated with the first flow sensing element;
determining a second temperature output associated with the second flow sensing element; and comparing the first temperature output and the second temperature output.

7. The flow sensing device of claim 1, wherein the controller component is further configured to:
in an instance in which the maximum allowable dwell time value is less than an end-of-flow factor, generate a second air bubble retention indication.

8. The flow sensing device of claim 7, wherein the end-of-flow factor is determined based at least in part on an estimated long flow void length in the flow path that is representative of an end-of-flow scenario.

9. A method comprising:
monitoring, by a controller component in electronic communication with a flow sensing component, at least one flow sensing component output from the flow sensing component, wherein the flow sensing component is disposed at least partially within a housing of a flow sensing device, and wherein the flow sensing component is configured to make direct contact with a flowing media in a flow path of the flow sensing device;
detecting, by the controller component, an air bubble at a location adjacent a surface of the flow sensing component based at least in part on the at least one flow sensing component output, wherein monitoring the at least one flow sensing component output comprises:
determining, by the controller component, whether the at least one flow sensing component output is less than a previous value of the at least one flow sensing component output; and
determining, by the controller component, whether the at least one flow sensing component output is equal to a predetermined minimal value;
determine an air bubble pass condition based on the at least one flow sensing component output being equal to the predetermined minimal value;
in response to determining the air bubble pass condition, initiating, by the controller component, a bubble dwell timer;
in response to determining the air bubble pass condition, generating an indication that the air bubble is present at a location adjacent the surface of the flow sensing component;
determining, by the controller component, a minimum permissible dwell time value based on a previous flow rate value and a width of the flow sensing component;
retrieving, by the controller component, a maximum allowable dwell time value; and
in an instance in which the maximum allowable dwell time value is greater than an air bubble dwell time value, generating, by the controller component, an air bubble retention indication.

10. The method of claim 9, further comprising:
in response to determining that the air bubble satisfies the air bubble pass condition, generating, by the controller component, an air bubble indication.

11. The method of claim 9, wherein the flow sensing device is positioned such that an air gap is formed adjacent the surface of the flow sensing device when the flowing media makes direct contact therewith, and wherein the controller component is configured to determine whether with the air bubble being joined to the air gap based on the air bubble pass condition.

12. The method of claim 9, wherein the flow sensing component comprises at least one heating element, a first flow sensing element positioned upstream with respect to the at least one heating element, and a second flow sensing element positioned downstream with respect to the at least one heating element.

13. The method of claim 12, wherein the flow sensing component comprises a sense die.

14. The method of claim 12, determining whether the air bubble satisfies an air bubble condition further comprises:

determining, by the controller component, a first temperature output associated with the first flow sensing element;

determining, by the controller component, a second temperature output associated with the second flow sensing element; and comparing, by the controller component, the first temperature output and the second temperature output.

15. The method of claim 9, further comprising:

in an instance in which the maximum allowable dwell time value is less than an end-of-flow factor, generating, by the controller component, a second air bubble retention indication.

16. The method of claim 15, wherein the end-of-flow factor is determined based at least in part on an estimated long flow void length in the flow path that is representative of an end-of-flow scenario.

\* \* \* \* \*